March 24, 1925.
E. W. FRY
WEED DRIFTER
Filed Nov. 22, 1922
1,530,551
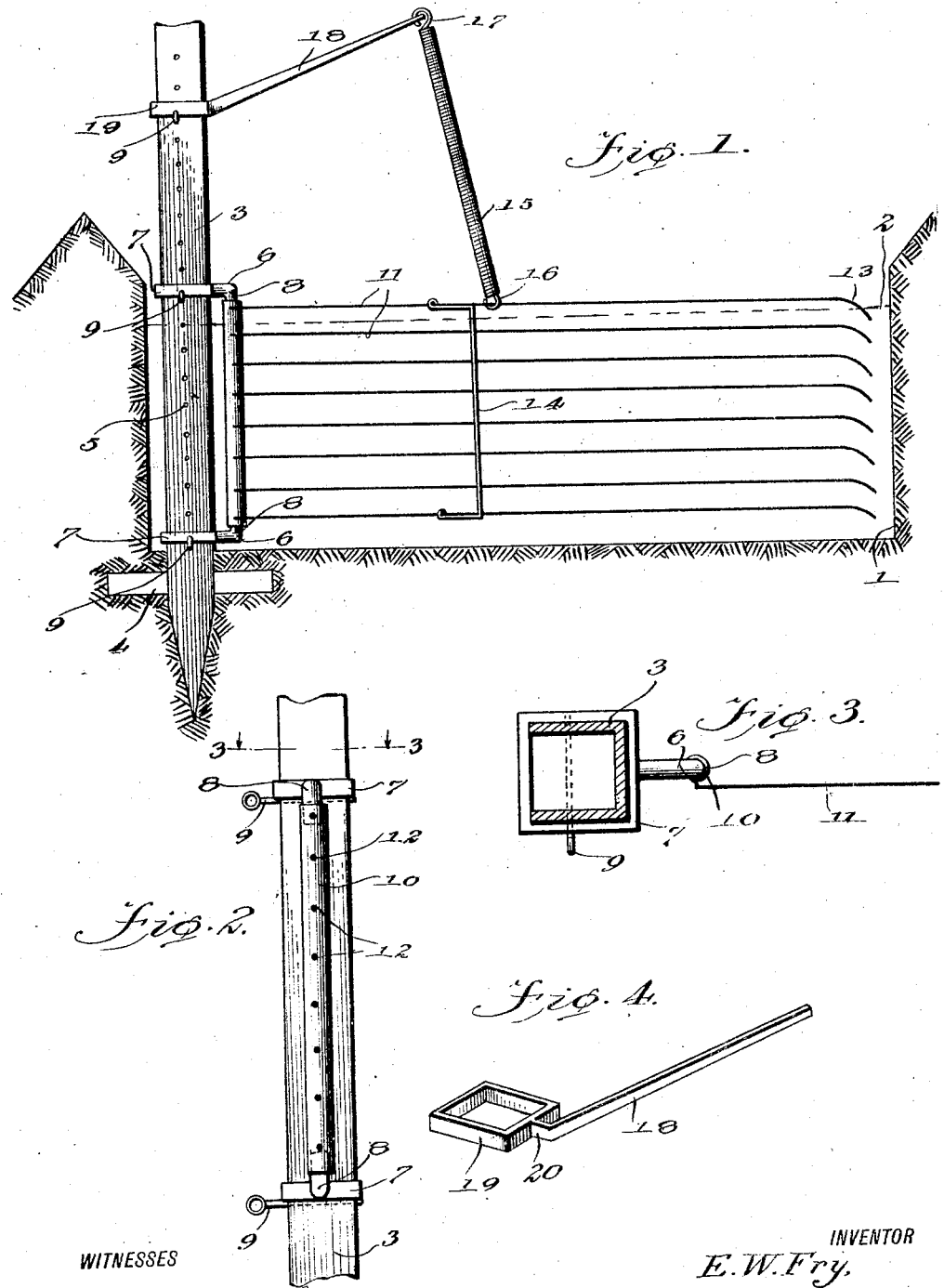
WITNESSES
INVENTOR
E. W. Fry,
BY
ATTORNEYS Patented Mar. 24, 1925.

1,530,551

UNITED STATES PATENT OFFICE.

EDWARD W. FRY, OF KALISPELL, MONTANA.

WEED DRIFTER.

Application filed November 22, 1922. Serial No. 602,563.

*To all whom it may concern:*

Be it known that I, EDWARD W. FRY, a citizen of the United States, and a resident of Kalispell, in the county of Flathead and State of Montana, have invented certain new and useful Improvements in Weed Drifters, of which the following is a specification.

My invention is a gate which is adapted to be positioned in a ditch, canal, or like conduit of an irrigation or other water system to collect at desirable points weeds or other material floating in partially submerged position or on the surface of the liquid flowing in the ditch, canal, or conduit, whereby the clogging of the intake of the ditch, canal or conduit because of the accumulation of floating material at such points, is obviated.

A further object of my invention is to provide a device of the character described which is simple in construction, can be manufactured at a relatively small cost, and which can be removably installed at predetermined points in a ditch or other conduit.

A still further object of my invention is to provide a device of the character described which is not likely to get out of order easily and which is thoroughly practical commercially.

Other objects and advantages will be apparent from the following description, and the novel features of the invention will be particularly outlined in the appended claims.

A practical embodiment of my invention is illustrated in the accompanying drawings, forming a part of this application, in which:—

Fig. 1 is a section through the ditch or canal, showing the embodiment of the invention in applied position therein, Fig. 2 is an enlarged elevation of a fragmentary portion of the device, certain elements thereof being omitted, Fig. 3 is a section substantially along the line 3—3 of Fig. 2 with the elements omitted from the latter supplied, and Fig. 4 is a perspective view of a bracket comprised in the device.

Referring now to the drawings, I show in Fig. 1, a ditch or open canal 1 in which a liquid flows, the level of the latter being indicated at 2. The ditch 1 is shown as having a substantially flat bottom and straight sides, being open above the liquid level, as is usual in ditches or canals of irrigation systems.

Prior to my invention, considerable difficulty has been experienced by users and others interested in maintaining a satisfactory movement of water through the ditches of irrigation systems because of the clogging of the intake of turn-outs or branches of the irrigation ditches, or the clogging of the ditches at various points by weeds or other débris which drifts in the water in submerged position or on the surface of the water. My invention provides means for collecting such weeds and débris at selected points, whereby the clogging of the ditches or the intake of turn-outs or branches thereof at other points, is obviated.

In carrying out my invention, I provide a vertical support 3 in the form of a stake or post, preferably of channel formation, and being pointed at one end, whereby the stake can be driven a desired distance into the earth to the bottom of the ditch, whereby the major portion of the post or stake extends vertically through the ditch adjacent to one side thereof and terminates at its upper end an appreciable distance above the water level 2. The post 3 is preferably held against displacement by anchor means 4 of any suitable known construction, surrounding the embedded portion thereof. The sides of the channel member constituting the post 3 are preferably arranged to extend in planes extending transversely of the ditch or, in other words, at right angles to the direction of movement of the liquid flowing in the latter. Series of vertically spaced openings 5 are formed through the respective sides of the channel member 3, the corresponding openings of the two series being horizontally alined. A pair of brackets 6—6 have frame portions 7—7 adapted to encircle the channel member 3 and to slidably fit the latter. The brackets 6—6 also include right angular rod portions 8—8, the extremities of which extend at right angles to the planes of the respective frame portions. The brackets 6—6 are arranged upon the channel member 3 so that the extremities of the right angular portions 8—8 are vertically alined and extend toward each other. The frame portions of the brackets are supported upon the channel member 3 in spaced relation by means of pins 9 projected through selected alined openings 5 of the two series of openings hereinbefore described, the pins 9 having end portions projecting beyond the remote faces of the sides of the channel member and serving as rests for the frame portions of the brackets.

A tubular member 10 or a rod-like member having sockets in the ends thereof, is supported for rotation about a vertical axis between the vertically alined extremities of the right angular bracket portions 8—8. This arrangement is effected by lifting the uppermost bracket 6 and fitting the member 10 upon the upturned end of the portion 8 of the lowermost bracket and then lowering the uppermost bracket until the downturned end of the portion 8 thereof enters the socket or bore in the upper end of the member 10.

The vertical member 10 carries a series of horizontally extending vertically spaced prongs or fingers 11 which may be lengths of spring wire having the inner end portions thereof bent laterally to the major portions thereof and fitted into openings 12 of a vertical series formed in the member 10. The respective openings 12 are spaced equi-distantly part and extend horizontally substantially in parallel relation to the openings 5. The fingers or prongs 11 are of a length to extend adjacent to the side of the ditch opposite that to which the post 3 is adjacent and transversely of the ditch. The fingers or prongs 11 are preferably bent or turned downwardly adjacent to their free ends, as indicated at 13 and are held in spaced relation intermediately by means of a vertical tie member 14 to which the respective prongs or fingers are secured in any suitable known manner.

It is desirable that means be provided for holding the series of prongs or fingers 11 against swinging movement about the axis of the vertical carrying member 10 in the direction of flow of the liquid in the ditch because of the force of the current or the impact of débris drifting against the prongs or fingers. It is desirable also that the means for holding the series of prongs or fingers in the manner just described shall be more or less elastic to permit yielding under actuation of an excessive force. To this end, I provide a relatively strong retractile spring 15 of coil formation, which spring is provided with a loop portion 16 engaged with the uppermost prong or finger 11 intermediate of its ends and with a loop portion 17 at its other end attached to the ends of an upwardly inclined arm 18 of a bracket comprising also a frame portion 19 slidably fitting the channel member 3 and being supported upon the latter at a predetermined distance above the level of the uppermost bracket 6 by means of one of the pins 9, the latter being engaged with selected alined openings 5 in the manner hereinbefore described. It is to be observed at this point that the arm 18 is merged at its lower end by means of a relatively short horizontal shank portion 20 into the side of the frame portion 19 that is adapted to extend at right angles to the side of the channel member 3 when the frame portion 19 is disposed upon the channel member in the position in which illustrated in the drawings. The arm 18 extends obliquely to a vertical plane extending midway between the sides of the channel member 3 and in the plane of the shank portion 20.

From the foregoing description of the various parts of the device, the operation thereof may be readily understood. The device is arranged in the ditch or canal such as that illustrated in Fig. 1, so that the uppermost prong or finger 11 is positioned above the water level, while the lowermost prong or finger is positioned in adjacent parallel relation to the bottom of the ditch or canal. With the arrangement described, the retractile spring 15 will be inclined from a vertical plane toward the direction from which the water in the ditch or canal flows into contact with the prongs or fingers 11. The prongs or fingers will thus be held transversely of the stream flowing in the ditch or canal and serve as a stop for the drifting weeds and other débris, whereby such weeds and débris will collect against the up-stream side of the device and may be removed therefrom at will. An excessive force against the action of the spring 15 will cause the fingers 11 to swing down-stream about the axis of the carrying member 10 and in consequence the device will not be broken or impaired if subjected to stresses such as are not likely to be received in the service for which intended.

The device is simple in construction and can be readily and removably applied in ditches and canals of irrigation systems or like liquid conduits for the purpose described.

Obviously my invention is susceptible of embodiment in forms other than that illustrated in the accompanying drawings, and I therefore consider as my own all modifications of the form of the device disclosed herein which fairly fall within the scope of the appended claims.

I claim:—

1. A device of the character described comprising an elongated support adapted to be secured in the bed of a ditch or like conduit in upstanding relation to said bed, a pair of brackets in sliding engagement with the support, said brackets and said support having cooperative means whereby said brackets may be secured on said support in predetermined spaced relation to each other.

a vertical carrier held between said brackets for rotation about a vertical axis, and a plurality of horizontally extending vertically spaced prongs each attached at one end to the carrier, whereby said prongs are adapted to extend transversely of the ditch or conduit.

2. A device of the character described comprising a vertical support of channel formation, said support being adapted to be driven into the bed of a ditch or like conduit and having series of vertically spaced openings through the sides thereof, the corresponding openings of the two series being horizontally alined, a pair of brackets in sliding engagement with the support, means engaging the openings in the sides of the support for supporting the brackets in predetermined spaced relation, a vertical carrier held between said brackets for rotation about a vertical axis, and a plurality of horizontally extending vertically spaced prongs or fingers each attached at one end to the carrier, whereby said prongs or fingers are adapted to extend transversely of the ditch or open conduit between the support and the remote wall of the ditch or conduit.

3. A device of the character described comprising a vertical support of channel formation, said support being adapted to be driven into the bed of a ditch or like conduit and having series of vertically spaced openings through the sides thereof, the corresponding openings of the two series being horizontally alined, a pair of brackets in sliding engagement with the support, means engaging the openings in the sides of the support for supporting the brackets in predetermined spaced relation, a vertical carrier held between said brackets for rotation about a vertical axis, a plurality of horizontally extending vertically spaced prongs or fingers each attached at one end to the carrier, whereby said prongs or fingers are adapted to extend transversely of the ditch or open conduit between the support and the remote wall of the ditch or conduit, and means carried by the support for yieldingly resisting swinging movement of the prongs or fingers about the axis of the carrier.

EDWARD W. FRY.